(12) United States Patent
Galor et al.

(10) Patent No.: US 10,088,909 B2
(45) Date of Patent: ***Oct. 2, 2018

(54) SESSIONLESS POINTING USER INTERFACE

(71) Applicant: Apple Inc., Cupertino, CA (US)

(72) Inventors: Micha Galor, Tel Aviv (IL); Jonathan Pokrass, Bat-Yam (IL); Amir Hoffnung, Tel Aviv (IL); Ofir Or, Ramat Gan (IL)

(73) Assignee: APPLE INC., Cupertino, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/919,751

(22) Filed: Oct. 22, 2015

(65) Prior Publication Data

US 2016/0041623 A1 Feb. 11, 2016

Related U.S. Application Data

(63) Continuation of application No. 13/592,352, filed on Aug. 23, 2012, now Pat. No. 9,218,063.

(60) Provisional application No. 61/526,692, filed on Aug. 24, 2011.

(51) Int. Cl.
*G06F 3/033* (2013.01)
*G06F 3/01* (2006.01)
*G06F 3/03* (2006.01)
*G06F 3/16* (2006.01)
*G06K 9/00* (2006.01)
*G06T 7/73* (2017.01)

(52) U.S. Cl.
CPC .............. *G06F 3/017* (2013.01); *G06F 3/013* (2013.01); *G06F 3/0304* (2013.01); *G06F 3/167* (2013.01); *G06K 9/00355* (2013.01); *G06T 7/75* (2017.01); *G06T 2207/30196* (2013.01)

(58) Field of Classification Search
CPC ......... G06F 3/017; G06F 3/0304; G06F 3/011
See application file for complete search history.

(56) References Cited

U.S. PATENT DOCUMENTS

| | | | |
|---|---|---|---|
| 6,581,068 B1 | 6/2003 | Bensoussan et al. |
| 7,263,668 B1 | 8/2007 | Lentz |
| 7,433,024 B2 | 10/2008 | Garcia et al. |
| 8,660,869 B2 | 2/2014 | MacLntyre et al. |
| 8,935,631 B2 | 1/2015 | Leonard et al. |
| 8,990,733 B2 | 3/2015 | Deutsch et al. |
| 9,015,606 B2 | 4/2015 | Zaman et al. |
| 9,052,820 B2 | 6/2015 | Jarrett et al. |
| 9,058,307 B2 | 6/2015 | Tien et al. |
| 9,075,460 B2 | 7/2015 | Mak et al. |
| 9,104,440 B2 | 8/2015 | Jarrett et al. |
| 9,158,445 B2 | 10/2015 | Wong et al. |

(Continued)

OTHER PUBLICATIONS

U.S. Appl. No. 14/485,840 Office Action dated Jun. 16, 2017.
(Continued)

*Primary Examiner* — Jennifer To
*Assistant Examiner* — Jasmine Wan
(74) *Attorney, Agent, or Firm* — D. Kligler IP Services Ltd.

(57) ABSTRACT

A method, including receiving, by a computer, a sequence of three-dimensional maps containing at least a hand of a user of the computer, and identifying, in the maps, a device coupled to the computer. The maps are analyzed to detect a gesture performed by the user toward the device, and the device is actuated responsively to the gesture.

17 Claims, 3 Drawing Sheets

(56) References Cited

U.S. PATENT DOCUMENTS

| | | |
|---|---|---|
| 9,207,955 B2 | 12/2015 | Wenig et al. |
| 9,213,468 B2 | 12/2015 | Zaman et al. |
| 9,504,920 B2 | 11/2016 | Karemmi et al. |
| 9,600,078 B2 | 3/2017 | Rafii et al. |
| 9,619,105 B1 | 4/2017 | Dal Mutto et al. |
| 2003/0071814 A1 | 4/2003 | Jou et al. |
| 2007/0192794 A1* | 8/2007 | Curtis ................. G06F 3/04817 725/42 |
| 2007/0211022 A1 | 9/2007 | Boillot |
| 2009/0228841 A1* | 9/2009 | Hildreth ................. G06F 3/0304 715/863 |
| 2010/0095773 A1 | 4/2010 | Shaw et al. |
| 2010/0137063 A1* | 6/2010 | Shirakawa ............. A63F 13/10 463/31 |
| 2010/0149096 A1* | 6/2010 | Migos ................. G06F 3/04883 345/158 |
| 2010/0229125 A1 | 9/2010 | Cha |
| 2010/0298655 A1* | 11/2010 | McCombie .......... A61B 5/0002 600/301 |
| 2010/0302145 A1* | 12/2010 | Langridge ............... G06F 3/011 345/157 |
| 2011/0161890 A1* | 6/2011 | Anderson ............... G06F 3/013 715/863 |
| 2011/0175822 A1* | 7/2011 | Poon .................. G06F 3/04842 345/173 |
| 2011/0289455 A1* | 11/2011 | Reville .................. G06F 3/011 715/830 |
| 2011/0296353 A1* | 12/2011 | Ahmed .................. G06F 3/017 715/848 |
| 2012/0038550 A1* | 2/2012 | Lemmey ................ G06F 3/017 345/156 |
| 2012/0089950 A1 | 4/2012 | Tseng et al. |
| 2012/0173067 A1* | 7/2012 | Szczerba ............... G02B 27/01 701/23 |
| 2012/0182226 A1 | 7/2012 | Tuli |
| 2012/0229377 A1* | 9/2012 | Kim ....................... G06F 3/017 345/157 |
| 2016/0026265 A1 | 1/2016 | Shaw et al. |

OTHER PUBLICATIONS

U.S. Appl. No. 15/233,969 Office Action dated Apr. 7, 2017.
U.S. Appl. No. 13/904,050 Office Action dated Jan. 15, 2016.
U.S. Appl. No. 15/434,081 Office Action dated Jul. 18, 2018.

* cited by examiner

SESSIONLESS POINTING USER INTERFACE

CROSS-REFERENCE TO RELATED APPLICATIONS

This application is a continuation of U.S. patent application Ser. No. 13/592,352, filed Aug. 23, 2012, which claims the benefit of U.S. Provisional Patent Application 61/526,692, filed Aug. 24, 2011, which is incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Three-dimensional human interface systems may identify not only the user's hands, but also other parts of the body, including the head, torso and limbs. For example, U.S. Patent Application Publication 2010/0034457, whose disclosure is incorporated herein by reference, describes a method for modeling humanoid forms from depth maps. The depth map is segmented so as to find a contour of the body. The contour is processed in order to identify a torso and one or more limbs of the subject. An input is generated to control an application program running on a computer by analyzing a disposition of at least one of the identified limbs in the depth map.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method including receiving, by a computer, a sequence of three-dimensional maps containing at least a hand of a user of the computer, identifying, in the maps, a device coupled to the computer, analyzing the maps to detect a gesture performed by the user toward the device, and actuating the device responsively to the gesture.

There is also provided, in accordance with an embodiment of the present invention an apparatus including a three-dimensional sensing device, and a computer configured to receive from the three-dimensional sensing device a sequence of three-dimensional maps containing at least a hand of a user of the computer, to identify, in the maps, an entity coupled to the computer, to analyze the maps to detect a gesture performed by the user toward the entity, and to actuate the entity responsively to the gesture.

There is additionally provided, in accordance with an embodiment of the present invention a computer software product including a non-transitory computer-readable medium, in which program instructions are stored, which instructions, when read by a computer, cause the computer to receive a sequence of three-dimensional maps containing at least a hand of a user of the computer, to identify, in the maps, a device coupled to the computer, to analyze the maps to detect a gesture performed by the user toward the device, and to actuate the device responsively to the gesture.

BRIEF DESCRIPTION OF THE DRAWINGS

The disclosure is herein described, by way of example only, with reference to the accompanying drawings, wherein.

DETAILED DESCRIPTION OF EMBODIMENTS

When using a tactile input device such as a mouse, the user typically manipulates the physical device in a two-dimensional plane comprising a horizontal X-axis and a vertical Y-axis. However, when interacting with a non-tactile three-dimensional (3D) user interface (also referred to herein as a 3D user interface), the user may perform gestures in mid-air, and perform the gestures from different positions within a field of view of a 3D sensor coupled to the interface.

U.S. Pat. No. 8,933,876, whose disclosure is incorporated herein by reference, describes focus gestures that enable a user to activate a 3D user interface and unlock gestures that enable the user to engage a locked 3D user interface. However, in instances where a user's interaction with a device controlled by a 3D user interface is very brief, requiring the user to initiate a session (with the device) by performing a focus gesture followed by an unlock gesture can be cumbersome.

Embodiments of the present invention provide methods and systems for a user to actuate a device (e.g., a television or a lighting fixture) via gestures described hereinbelow. In some embodiments the device is driven by a computer executing a sessionless pointing user interface (SPUI) that enables sessionless control of the device, i.e., wherein no session is initiated by the user. For example, the user can turn on a light by pointing at the light.

Additionally or alternatively, the computer can be configured to reduce false positives (i.e., the user may point at the light inadvertently during a conversation) by actuating the device in response to a gesture and a vocal command. For example, the computer can turn on the light in response to the user saying "Light" while pointing at the light.

DETAILED DESCRIPTION OF EMBODIMENTS

Figure 1:
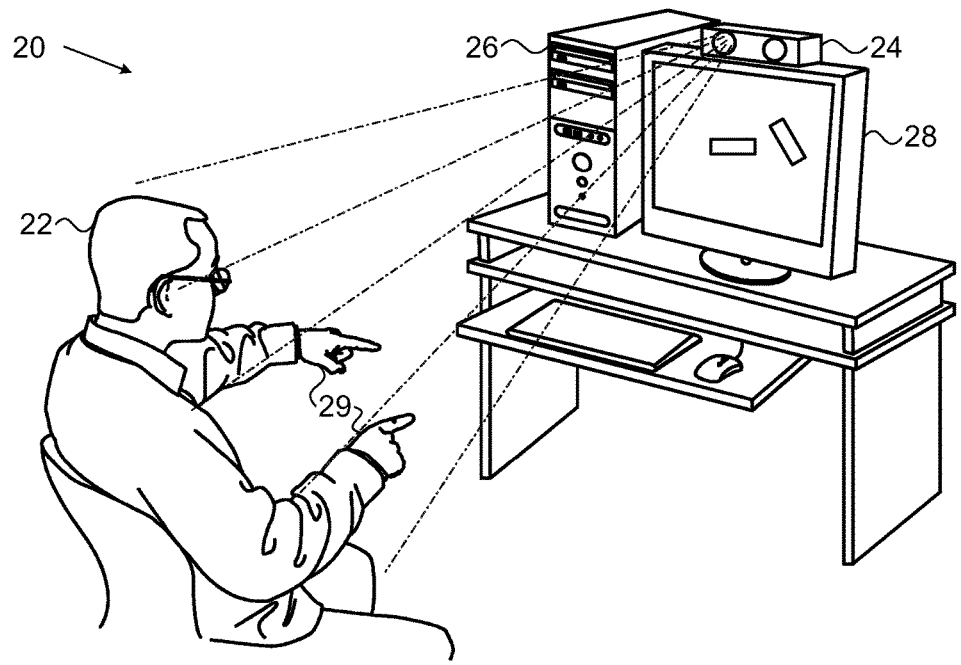
FIG. 1 is a schematic, pictorial illustration of a computer system executing a sessionless pointing user interface (SPUI), in accordance with an embodiment of the present invention.

FIG. 1 is a schematic, pictorial illustration of a sessionless pointing user interface (SPUI) 20 for operation by a user 22 of a computer 26, in accordance with an embodiment of the present invention. The SPUI is based on a 3D sensing device 24 coupled to the computer, which captures 3D scene information of a scene that includes the body (or at least a body part, such as hands 29) of the user. Device 24 or a separate camera (not shown in the figures) may also capture video images of the scene. The information captured by device 24 is processed by computer 26, which drives a display 28 accordingly.

Computer 26, executing SPUI 20, processes data generated by device 24 in order to reconstruct a 3D map of user 22. The term "3D map" refers to a set of 3D coordinates measured with reference to a fixed set of axes based on device 24. The 3D coordinates represent the surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

In some configurations, sensing device 24 may include a microphone (not shown) configured to convey audio signals generated in response to speech or sound from user 22 to computer 26. Computer 26 can be configured to process the audio signals, thereby enabling the computer to respond to vocal commands from user 22, in addition to physical gestures performed by the user.

Computer 26 typically comprises a general-purpose computer processor, which is programmed in software to carry out the functions described hereinbelow. The software may be downloaded to the processor in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Various techniques may be used to reconstruct the 3D map of the body of user 22. In one embodiment, computer 26 extracts 3D connected components corresponding to the parts of the body from the depth data generated by device 24. Techniques that may be used for this purpose are described, for example, in U.S. patent application Ser. No. 12/854,187, filed Aug. 11, 2010, whose disclosure is incorporated herein by reference. The computer analyzes these extracted components in order to reconstruct a "skeleton" of the user's body, as described in the above-mentioned U.S. Patent Application Publication 2010/0034457, or in U.S. patent application Ser. No. 12/854,188, filed Aug. 11, 2010, whose disclosure is also incorporated herein by reference. In alternative embodiments, other techniques may be used to identify certain parts of the user's body, and there is no need for the entire body to be visible to device 24 or for the skeleton to be reconstructed, in whole or even in part.

Using the reconstructed skeleton, computer 26 can assume a position of a body part such as a tip of finger 30, even though the body part (e.g., the fingertip) may not be detected by the depth map due to issues such as minimal object size and reduced resolution at greater distances from device 24. In some embodiments, computer 26 can auto-complete a body part based on an expected shape of the human part from an earlier detection of the body part, or from tracking the body part along several (previously) received depth maps.

In some embodiments, the information generated by computer 26 as a result of this skeleton reconstruction includes the location and direction of the user's head, as well as of the arms, torso, and possibly legs, hands and other features, as well. Changes in these features from frame to frame (i.e. depth maps) or in postures of the user can provide an indication of gestures and other motions made by the user. User posture, gestures and other motions may provide a control input for user interaction with interface 20. These body motions may be combined with other interaction modalities that are sensed by device 24, including user eye movements, as described above, as well as voice commands and other sounds. Interface 20 thus enables user 22 to perform various remote control functions and to interact with applications, interfaces, video programs, images, games and other multimedia content appearing on display 28.

Pointing User Interface

Figure 2:
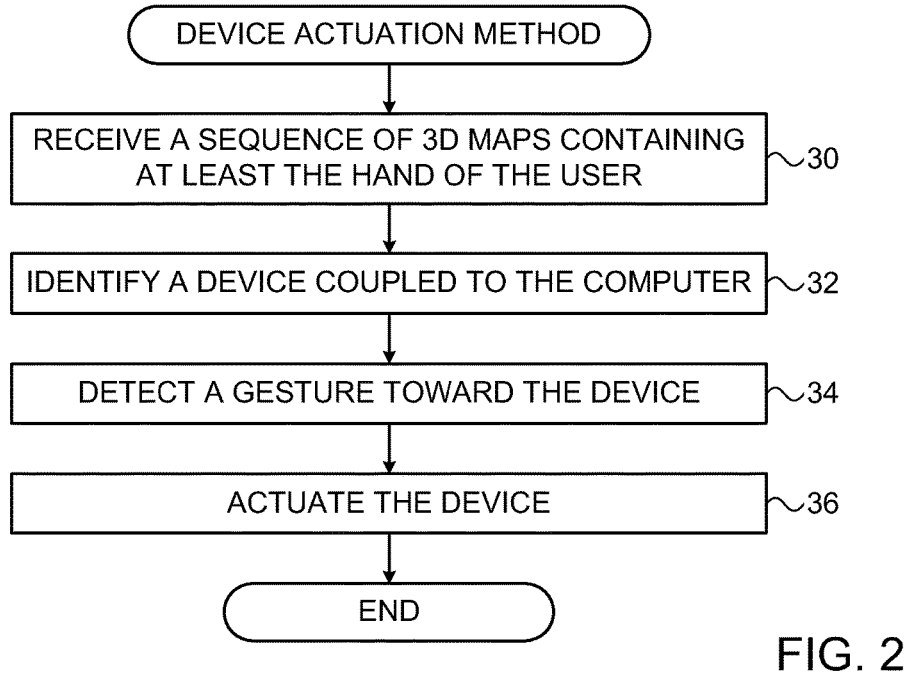
FIG. 2 is a flow diagram that schematically illustrates a method of using a gesture to actuate a device coupled to the computer, in accordance with an embodiment of the present invention.
Figure 3:
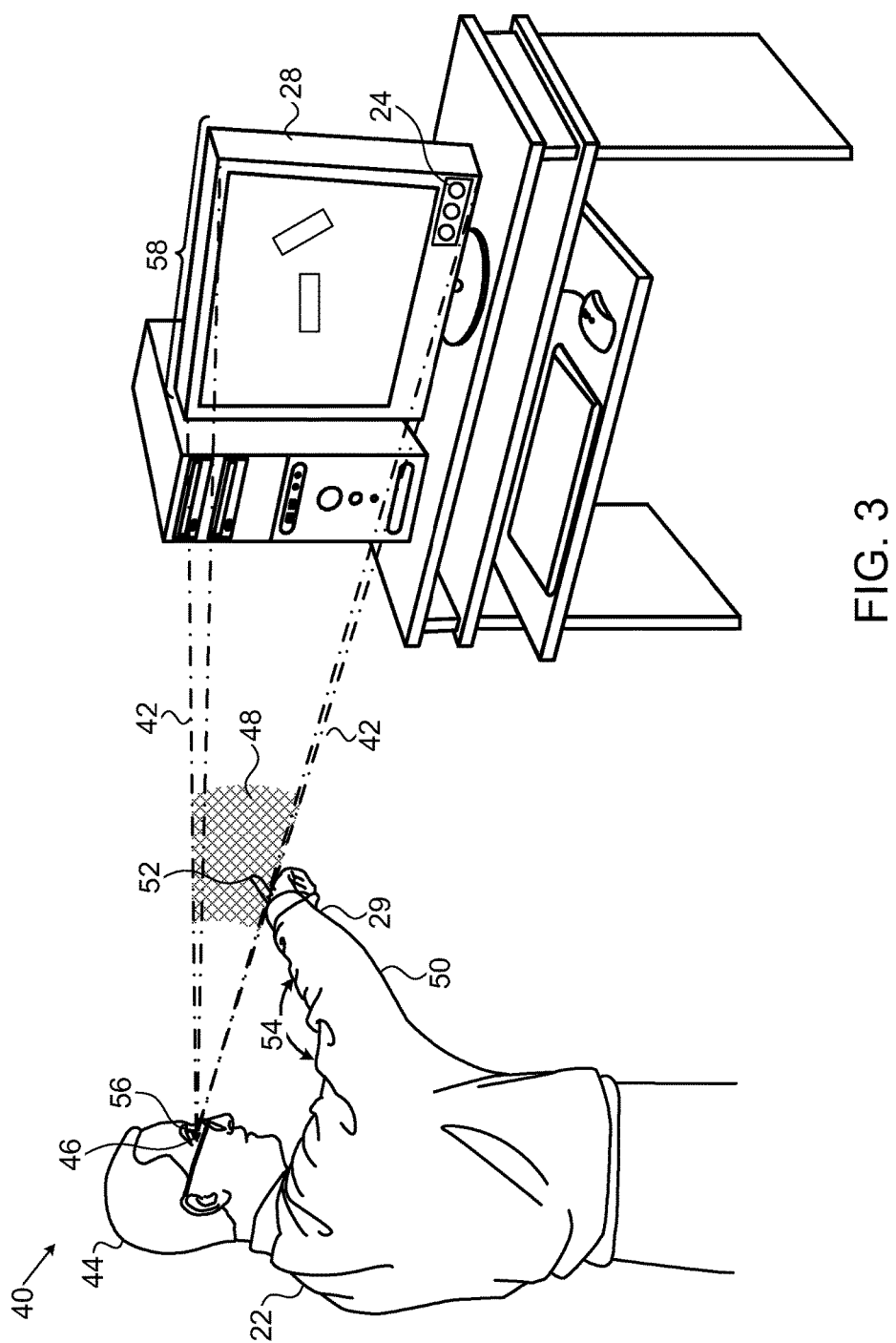
FIG. 3 is a schematic pictorial illustration of a first scene comprising a user interacting with the SPUI, in accordance with an embodiment of the present invention.

FIG. 2 is a flow diagram that schematically illustrates a method of actuating display 28, and FIG. 3 is a schematic pictorial illustration of a first scene 40 comprising user 22 interacting with computer 26, in accordance with an embodiment of the present invention. In the configuration shown in FIG. 3, 3D sensing device 24 and computer 26 are both integrated into display 28.

In a receive step 30, computer 26 receives, from sensing device 24, a sequence of 3D maps containing at least hand 29, and in an identification step 32, the computer identifies in the maps the hand and at least one device or entity coupled to, and driven by (i.e., controlled by), the computer. In the configuration shown in FIG. 3, the device comprises display 28 that incorporates sensing device 24. Therefore, computer 26 can interpret a gesture toward sensing device 24 as a gesture toward display 28.

In other configurations as described hereinbelow, computer 26 may control multiple devices in proximity to user 22. Examples of devices that can be driven by computer 26 include, but are not limited to lamp fixtures, ventilation (i.e., heating/cooling) units, ceiling fans and electronic entertainment systems. If computer 26 is controlling multiple devices in proximity to user 22, then the user can identify the location of the devices during an initialization step. During the initialization step, computer 26 can identify devices in proximity to the sensing device (e.g., via Bluetooth or another communication protocol known in the art), present interactive items 38 on display 28 corresponding to each of the identified devices, and direct the user to first point at a given one of the interactive items and then point to the corresponding device.

Upon identifying hand 29 and display 28, computer 26 can initialize sessionless pointing user interface (SPUI) 20 by defining a pyramid shaped region 42 within a field of view of 3D sensor 24. In the example shown in FIG. 3, pyramid shaped region 42 is rectangular and comprises an apex (i.e., the narrow tip) 56 that meets user 22, and a base (i.e., the wide end) 58 that encompasses display 28. In some embodiments, computer 26 positions apex 56 at a head 44 or an eyeball 46 of user 22.

In a detect step 34, computer 26 detects, in the sequence of 3D maps, a gesture directed toward display 28. Examples of gestures that user 22 can direct toward display 28 include, but are not limited to a grab gesture and pointing gestures. The grab gesture is described in U.S. patent application Ser. No. 13/423,314, filed on Mar. 19, 2012, whose disclosure is incorporated herein by reference, and comprises user 22 closing at least some fingers of hand 29.

Pointing gestures are described in PCT International Application PCT/IB2012/050577, filed Feb. 9, 2012, whose disclosure is incorporated herein by reference, and include a point-select, a point-touch, and a point-hold gesture. For example, to perform the point-touch gesture, user 22 points hand toward display 28, stops or slows down the hand, and then pulls the hand back toward the user.

To reduce instances of false positives, computer 26 may be configured to define conditions for identifying a pointing gesture when analyzing the 3D maps. Examples of conditions include:

Defining an interaction region 48 within pyramid shaped region 42, and identifying a pointing gesture upon the 3D maps indicating user 22 positioning hand 29 within region 48 and moving the hand toward the display.

Defining an angle threshold (e.g., 90 degrees) for elbow 50, and identifying a pointing gesture upon the 3D maps indicating user 22 extending hand 29 toward the display and extending elbow 50 at an angle 54 greater than or equal to the angle threshold.

Defining a minimum time period (e.g., 200 milliseconds), and identifying a pointing gesture upon the 3D maps indicating user 22 pausing hand 29 for the minimum time period after extending hand 29 toward the display.

Requiring a minimum time period enables computer 26 to mimic the natural behavior of an individual pointing at an object.

In some embodiments, computer 26 may be configured to detect gestures performed by user 22 with fingers of hand 29, such as an index finger 52. Gestures performed by user 22 with hand 29 are referred to herein as hand gestures, and gestures performed with the fingers of the hand are referred to herein as finger gestures. Performing finger gestures can help reduce fatigue while interacting with computer 26. For example, rather than keeping hand 29 raised to perform a hand gesture, user 22 can keep the hand resting on a lap (i.e., while sitting), and perform gestures with the fingers of hand 29.

In some embodiments, computer 26 can be configured at either a higher resolution (also referred to herein as finger resolution) to detect the position (i.e., location and orientation) of individual fingers of hand 29, or a lower resolution (also referred to herein as hand resolution) to detect the position of hand 29. Additionally or alternatively, computer 26 may be configured to detect hand gestures and finger gestures at shorter distances between user 22 and 3D sensing device 24, and to detect hand gestures at longer distances between the user and the 3D sensing device. When configured for finger resolution, computer can respond to finger gestures such as a finger pointing gesture or a grab gesture.

Returning to the flow diagram, in an actuation step 36, computer 26 actuates the device to which the user is pointing, and the method ends. In the configuration shown in FIG. 3, computer 26 can actuate (i.e., turn on) display 28 in response to a pointing gesture performed by user 22. In alternative embodiments, computer 26 can present multiple interactive items (not shown) on display 28, identify a given interactive item to which the user is pointing, and actuate the identified interactive item. For example, computer 26 may present advertisements for multiple restaurants on display 28, and present detailed information on a given restaurant upon detecting a gesture directed toward the advertisement of the given restaurant.

In some embodiments, selecting a given interactive item comprises executing a software application associated with the given interactive item. In further embodiments the given interactive item is associated with a media item (e.g., a music track or a movie), and selecting a given interactive item comprises playing a media file associated with the given interactive item.

In operation, computer 26 can calculate a pointing geometry for any number of users 22 interacting with the computer. In embodiments where computer 26 is configured for hand resolution, the computer typically responds to a given user 22 performing a pointing gesture within pyramid shaped region 42. Therefore, if there is more than one user interacting with computer 26, then the computer can define a separate pyramid shaped region 42 for each of the users. In alternative embodiments wherein computer is configured for finger resolution, the computer can be configured to respond to pointing gestures performed by user 22 both inside and outside pyramid shaped region 42.

Figure 4:
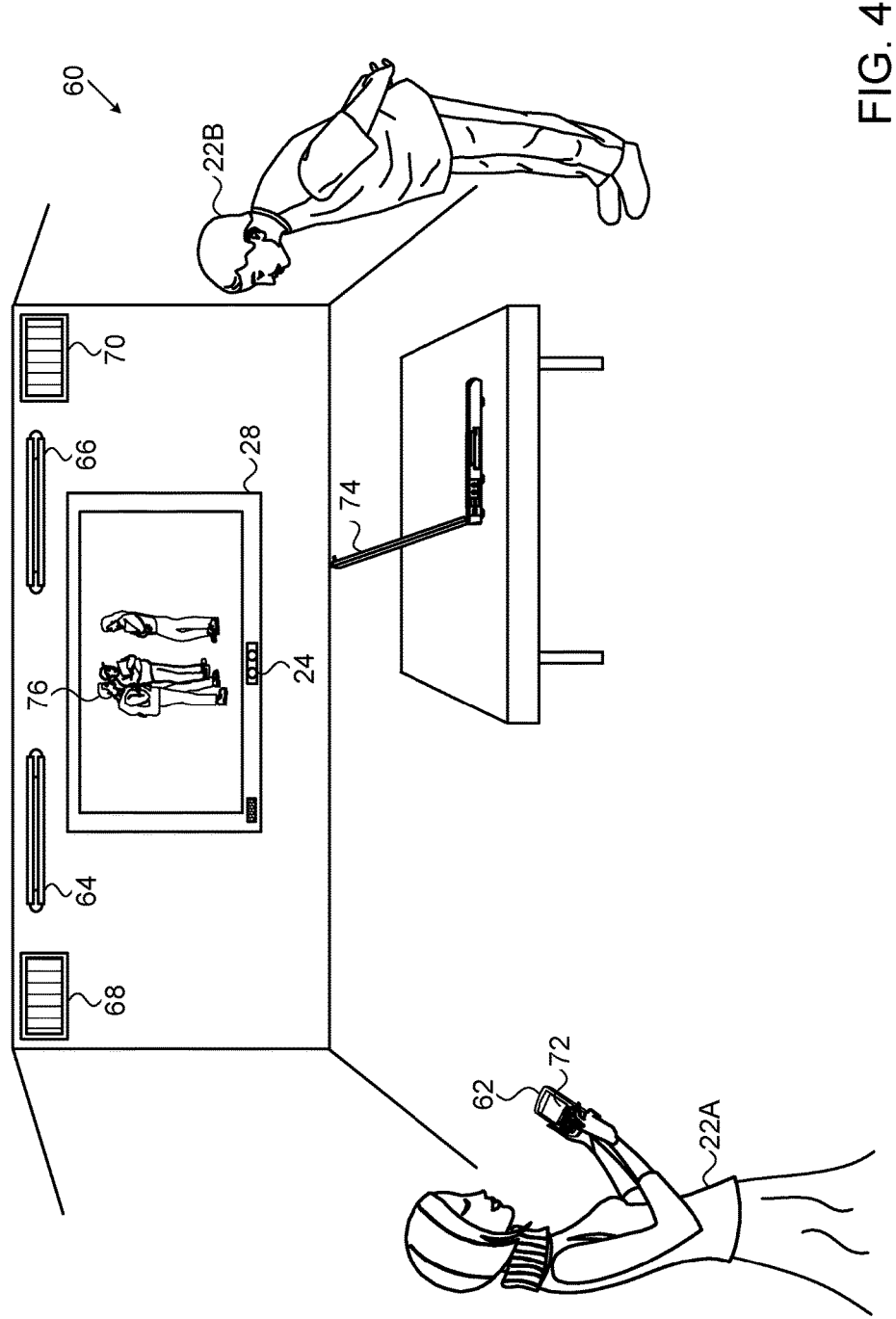
FIG. 4 is a schematic pictorial illustration of a second scene comprising multiple users interacting with the SPUI, in accordance with an embodiment of the present invention.

FIG. 4 is a schematic pictorial illustration of a second scene 60 (also referred to herein as room 60) comprising multiple users 22 interacting with computer 26, in accordance with an embodiment of the present invention. In the description of FIG. 4 herein, users 22 may be differentiated by appending a letter to the identifying numeral, so that the users comprise users 22A and 22B. As explained in detail hereinbelow, computer 26 can be configured to control display 28, lighting fixtures 64 and 66, and air vents 68 and 70.

Using gestures described herein, a given user 22 can individually control multiple devices configured to be driven by computer 26 (i.e., in addition to display 28). In one example, computer 26 can turn on (or off) a given one of the lighting fixtures in response to detecting, in the 3D maps, a pointing gesture directed toward the given lighting fixture.

In another example, computer 26 can open and close a given one of the air vents in response to detecting, in the 3D maps, a gesture directed toward the given air vent. To open the given air vent, user 22 can perform a release gesture toward the given air vent. The release gesture, described in U.S. patent application Ser. No. 13/423,314, filed on Mar. 19, 2012, whose disclosure is incorporated herein by reference, comprises user relaxing hand 29 so as to open the hand from a closed or folded state. Similarly, to close the given air vent the user can perform a grab gesture (as described supra) toward the given air vent.

While the configuration of scene 60 includes a single 3D sensing device 24, other configurations may include multiple 3D sensors, and are considered to be within the spirit and scope of the present invention. In some embodiments additional sensing devices 24 may be positioned in room 60, thereby enabling computer 26 to monitor the entire room (i.e., no blind spots) for gestures performed by the users. In alternative embodiments, the devices (e.g., the lighting fixtures and the air vents) may contain 3D sensors that are configured to communicate with computer 26.

In some embodiments, in addition to controlling multiple devices, a given user 22 can perform a pointing gesture to select one or more additional users in the user's vicinity. For example, user 22A can perform a first pointing gesture to select an icon on display 28 to start a multiplayer game, and then perform a subsequent pointing gesture directed toward user 22B user, thereby indicating user 22B as an additional participant in the game.

In additional embodiments, computer 26 can be configured to have the actuated device communicate with a further device in response to a subsequent gesture directed toward the further device. In a first example, user 22A wants to transfer a digital photograph 72 from a smartphone 62 to a photo album application 76 that computer 26 is presenting on display 28. Computer 26 can update the photo album upon detecting, in the 3D maps, user 22A performing an initial pointing gesture directed toward smartphone 62 and a subsequent pointing gesture directed toward display 28.

In a second example, computer 26 presents a web page on display 28, and user 22B wants to copy the uniform resource locator (URL) of the web page to a web browser application executing on a laptop computer 74. Computer 26 can copy the URL to the web browser application upon detecting, in the 3D maps, user 22B performing an initial pointing gesture directed toward display 28 and a subsequent pointing gesture directed toward laptop computer 74.

In a third example, user 22A wants to adjust the temperature in room 60. Computer 26 can present an air conditioning control menu (e.g., with icons for controlling settings such as temperature and fan speed) on display 28 in response to detecting, in the 3D maps, user 22A performing an initial pointing gesture directed toward one of the air vents and a subsequent pointing gesture directed toward display 28.

While the examples hereinabove describe using pointing gestures for multiple device interaction, other gestures are considered to be within the spirit and scope of the present invention. For example, computer 26 can copy the URL of the web page presented on display 28 to laptop computer 74 in response to detecting, in the 3D maps, user 22B performing a grab gesture directed toward display 28 and subsequent performing a release gesture directed toward laptop computer 74.

In scene 60, light fixture 64 is positioned in proximity to air vent 68, and light fixture 66 is positioned in proximity to air vent 70. In operation, if a given user 22 does not accurately "aim" a gesture toward an intended device, the computer may actuate a different device responsively to the gesture. For example, if user 22B intends to turn on light 66 but performs a pointing gesture toward air vent 70, computer 26 may turn on air vent 70 in response to the pointing gesture.

In some embodiments, computer 26 be configured to actuate a given device in response to a combination of a vocal (i.e., audio) command and a gesture. For example, to turn on lighting fixture 66, the user can say "Light" while pointing in proximity to lighting fixture 66. Combining vocal command processing with gesture recognition can enhance the accuracy of computer 26 controlling multiple devices in proximity to each other.

There may be instances user 22 performs a pointing gesture without intending to actuate a device controlled by computer 26. For example, user 22A can point toward user 22B during a conversation. To reduce the instances of false positives (i.e., unintentional pointing gestures), computer 26 can be configured to determine the intent of user 22 by detecting (and tracking), in the 3D maps, a gaze of the user, and actuating a given device in response to the gaze and a gesture directed toward the given device. In some embodiments tracking the gaze of the user comprises detecting an orientation of head 44 and/or eyeball 46.

For example, computer 26 can be configured to respond to a pointing gesture directed towards display 28 only if the 3D maps indicate that the user's gaze is directed toward the display. Identifying a gaze direction of user 22 is described in PCT International Application PCT/IB2012/050577, filed Feb. 9, 2012, whose disclosure is incorporated herein by reference.

It will be appreciated that the embodiments described above are cited by way of example, and that the present invention is not limited to what has been particularly shown and described hereinabove. Rather, the scope of the present invention includes both combinations and subcombinations of the various features, including the transformations and the manipulations, described hereinabove, as well as variations and modifications thereof which would occur to persons skilled in the art upon reading the foregoing description and which are not disclosed in the prior art.

We claim:

1. A method, the method comprising:
   identifying, by a computer with a display, a controlled device that is controlled by the computer, the controlled device is other than the computer display;
   receiving, by a computer, a sequence of three-dimensional maps including at least an arm, an elbow and a hand, of a user of the computer;
   detecting, in the maps, a gaze direction of the user;
   analyzing the maps to detect a pointing gesture performed by the arm and the hand of the user toward the controlled device,
   wherein analyzing the maps comprises defining a pyramid shaped region having an apex meeting the user and a base encompassing the device, and defining an interaction region contained within the pyramid shaped region; and actuating the controlled device responsively to the pointing gesture on condition that the elbow is extended in the pointing gesture toward the controlled device at an angle no less than a predefined angular threshold, and on condition that the hand is positioned within the interaction region and moved within the interaction region toward the controlled device, and the gaze direction.

2. The method according to claim 1, wherein the controlled device is actuated only when the elbow has been extended in the gesture for at least a predefined minimum time period.

3. The method according to claim 1, and comprising receiving a vocal command from the user, wherein the controlled device is actuated in response to the gesture and the vocal command.

4. The method according to claim 1, and comprising detecting, in the maps, a gaze direction of the user, wherein the controlled device is actuated in response to the gesture and the gaze direction.

5. The method according to claim 1, and comprising communicating between the controlled device and a further device upon detecting, in the maps, a subsequent gesture directed toward the further device.

6. The method according to claim 1, wherein the predefined angular threshold is at least 90°, such that the controlled device is actuated only when the elbow is extended in the pointing gesture toward the controlled device at an angle greater than or equal to 90°.

7. An apparatus, comprising:
a three-dimensional sensing device; and
a computer configured to identify a controlled device that is controlled by the computer, the controlled device is other than a computer display, to receive from the three-dimensional sensing device a sequence of three-dimensional maps including at least an arm, an elbow and a hand, of a user of the computer, to detect, in the maps, a gaze direction of the user, to analyze the maps to detect a pointing gesture performed by the arm and the hand of the user toward the controlled device and to define a pyramid shaped region having an apex that meets the user and a base encompassing the device and an interaction region contained within the pyramid shaped region, and to actuate the controlled device responsively to the pointing gesture on condition that the elbow is extended in the pointing gesture toward the controlled device at an angle no less than a predefined angular threshold, and on condition that the hand is positioned within the interaction region and is moved within the interaction region toward the controlled device and the gaze direction.

8. The apparatus according to claim 7, wherein the computer is configured to actuate the controlled device only when the elbow has been extended in the gesture for at least a predefined minimum time period.

9. The apparatus according to claim 7, wherein the computer is configured to receive a vocal command from the user, and to actuate the controlled device in response to the gesture and the vocal command.

10. The apparatus according to claim 7, wherein the computer is configured to detect, in the maps, a gaze direction of the user, and to actuate the controlled device in response to the gesture and the gaze direction.

11. The apparatus according to claim 7, wherein the computer is configured to convey communication between the controlled device and a further device upon detecting, in the maps, a subsequent gesture directed toward the further device.

12. The apparatus according to claim 7, wherein the predefined angular threshold is at least 90°, such that the controlled device is actuated only when the elbow is extended in the pointing gesture toward the controlled device at an angle greater than or equal to 90°.

13. A computer software product comprising a non-transitory computer-readable medium, in which program instructions are stored, which instructions, when read by a computer, cause the computer to identify a controlled device that is controlled by the computer, the controlled device is other than a computer display, to receive a sequence of three-dimensional maps including at least an arm, an elbow and a hand, of a user of the computer, to detect, in the maps, a gaze direction of the user, to analyze the maps to detect a pointing gesture performed by the arm and the hand of the user toward the controlled device and to define a pyramid shaped region having an apex that meets the user and a base encompassing the device and an interaction region contained within the pyramid shaped region, and to actuate the controlled device responsively to the pointing gesture on condition that the elbow is extended in the pointing gesture toward the controlled device at an angle no less than a predefined angular threshold, and on condition that the hand is positioned within the interaction region and moved within the interaction region toward the controlled device and the gaze direction.

14. The product according to claim 13, wherein the instructions cause the computer to actuate the controlled device only when the elbow has been extended in the gesture for at least a predefined minimum time period.

15. The product according to claim 13, wherein the instructions cause the computer to receive a vocal command from the user, and to actuate the controlled device in response to the gesture and the vocal command.

16. The product according to claim 13, wherein the instructions cause the computer to detect, in the maps, a gaze direction of the user, and to actuate the controlled device in response to the gesture and the gaze direction.

17. The product according to claim 13, wherein the predefined angular threshold is at least 90°, such that the controlled device is actuated only when the elbow is extended in the pointing gesture toward the controlled device at an angle greater than or equal to 90°.

* * * * *